United States Patent
Kirby et al.

(10) Patent No.: US 8,135,054 B2
(45) Date of Patent: Mar. 13, 2012

(54) PROCESSING OF INTERFERENCE ON A RADIOFREQUENCY SIGNAL BY POWER INVERSION

(75) Inventors: Estelle Kirby, Valence (FR); Alain Renard, Chabeuil (FR)

(73) Assignee: Thales (FR)

( * ) Notice: Subject to any disclaimer, the term of this patent is extended or adjusted under 35 U.S.C. 154(b) by 896 days.

(21) Appl. No.: 12/126,864

(22) Filed: May 24, 2008

(65) Prior Publication Data

US 2008/0291982 A1 Nov. 27, 2008

(30) Foreign Application Priority Data

May 25, 2007 (FR) ..................... 07 03732

(51) Int. Cl.
*H04B 1/00* (2006.01)
(52) U.S. Cl. ........ 375/148; 375/316; 375/346; 375/285; 375/147; 455/234.1
(58) Field of Classification Search .................. 375/316, 375/346, 285, 147, 148; 455/234.1
See application file for complete search history.

(56) References Cited

U.S. PATENT DOCUMENTS

| | | | |
|---|---|---|---|
| 6,670,914 B1 | 12/2003 | Najarian et al. | |
| 7,280,812 B2 * | 10/2007 | Demir et al. | 455/232.1 |
| 7,715,496 B2 * | 5/2010 | Zhidkov et al. | 375/316 |
| 2004/0091025 A1 | 5/2004 | Sindhushayana et al. | |
| 2007/0064923 A1 * | 3/2007 | Schmukler et al. | 379/406.1 |
| 2008/0215108 A1 * | 9/2008 | Zhu et al. | 607/17 |
| 2009/0004990 A1 * | 1/2009 | Renard et al. | 455/296 |
| 2009/0104883 A1 * | 4/2009 | Renard et al. | 455/234.1 |

FOREIGN PATENT DOCUMENTS

| | | |
|---|---|---|
| EP | 0430468 A2 | 6/1997 |
| EP | 1111802 A1 | 6/2001 |
| FR | 2832878 A1 | 5/2003 |
| WO | 03058270 A1 | 7/2003 |

* cited by examiner

*Primary Examiner* — Siu Lee
(74) *Attorney, Agent, or Firm* — Lowe Hauptman Ham & Berner, LLP (57) ABSTRACT

The invention relates to a radiofrequency receiver, notably for satellite positioning applications, needing to operate in an environment where interference is dense, notably when it involves pulses transmitted by DME beacons. Below the useful signal suppression threshold, amplitude or power are inverted to improve the dynamic interference response time. Advantageously, the useful signal suppression threshold and the set point power or amplitude are determined by analyzing the amplitude or power probability density function in its part enriched with low amplitude/power samples.

16 Claims, 7 Drawing Sheets

PROCESSING OF INTERFERENCE ON A RADIOFREQUENCY SIGNAL BY POWER INVERSION

RELATED APPLICATIONS

The present application is based on, and claims priority from, French Application Number 07 03732, filed May 25, 2007, the disclosure of which is hereby incorporated by reference herein in its entirety.

FIELD OF THE INVENTION

The present invention applies to the radiofrequency receivers that have to receive weak signals in a pulsed interference environment.

BACKGROUND OF THE INVENTION

Positioning receivers typically received weak signals in a pulsed interference environment which use the signals received from GNSS (Global Navigation Satellite System) satellite constellations such as the GPS (Global Positioning System) or enhanced GPS systems, GLONASS (Global Orbiting Navigation Satellite System) and, in the near future, Galileo. The received signal is typically located a few tens of dB below the thermal noise of the receiver. The signal processing needs to allow for the recovery of one or more carriers and one or more modulation codes of said carriers which contain characteristic information on the satellite transmitting said carriers. The central part of the digital processing is a correlation of the received signals with local replicas of said signals. These processing operations presuppose a minimum signal-to-noise ratio at the correlation input of ten or so dBHz. This minimum is not reached in the presence of interference that saturates the receiver to the point of very substantially degrading the useful signal. Such is typically the case with signals used for locating the DME (Distance Measuring Equipment) system relative to notable points on the ground. The ground beacons transmit signals in response to the interrogation signals transmitted by the aircraft. These ground beacons and the onboard interrogators transmit signals of high instantaneous power (of the order of ten or so kilowatts) in the frequency bands used for the positioning signals (in the 1200 MHz region). One known solution to this problem is notably the so-called "blanking" technique which consists in identifying the interfering signal and eliminating the received signal disturbed by the latter from the subsequent processing operations. This solution does not work when the interference density increases to the point of almost permanently covering the useful signal. In this case, the blanking causes any useful signal to be eliminated at the same time as the interfering signal. This type of scenario is likely to occur in a large portion of the European air space, notably at an altitude of around 40 000 feet where the number of DME beacons seen by an aircraft can be of the order of 60 at maximum traffic density times. It is possible, to improve the effectiveness of the blanking, to subdivide the band into several subbands and perform the blanking on each of the subbands which, for given interferences, allows a greater proportion of the useful signal to remain and therefore enhances the signal-to-noise ratio.

However, producing an effective blanking presupposes a servocontrolling of the gain of the receiver on a thermal noise reference, which introduces a loop delay that is prejudicial in cases of rapidly changing interference scenarios.

SUMMARY OF THE INVENTION

The present invention makes it possible to overcome this delay.

To this end, the present invention proposes a device for receiving a radiofrequency navigation signal comprising a module for estimating a characteristic quantity of said signal chosen from the amplitude, power group, a module for filtering said quantity and a module for inverting said quantity, wherein at least one parameter of at least one of the modules of the estimation, filtering group is adjustable to perform an optimum processing of interferences disturbing the radiofrequency signal.

Advantageously, one of the adjustable parameters of the inventive reception device is the sampling frequency of the filtering module set according to the characteristics of the initial signal and those of the interfering signal.

Advantageously, at least one of the adjustable parameters of a module of the inventive reception device is a parameter for calculating a function for estimating the thermal noise of the receiver.

Advantageously, the inventive reception device also comprises a module for estimating the thermal noise, the outputs of which are supplied to the module for estimating said characteristic quantity of said signal to correct the bias of said estimation.

Advantageously, said module for estimating the thermal noise comprises a submodule for estimating a characteristic quantity of said signal chosen from the amplitude, power group, a submodule for filtering said quantity, a submodule for automatically controlling the gain of the receiver, a submodule for controlling said automatic gain control submodule by the outputs of the filtering submodule, the parameters of said control module being adjustable to provide a more or less optimum gain of the receiver.

Advantageously, the inventive reception device comprises only a module for estimating the characteristic quantity of the signal chosen from the amplitude/power group.

Advantageously, the inventive reception device comprises only a module for filtering the signal.

Advantageously, the submodule for controlling the inventive reception device comprises a submodule for analyzing the probability density function of said characteristic quantity of said signal.

Advantageously, the submodule for analyzing the probability density function of said characteristic quantity of said signal performs an estimation based on a chosen comparison point.

Advantageously, the submodule for analyzing the probability density function of said characteristic quantity of said signal works on a sampling of the received signals enriched with low power signals.

Advantageously, the submodule for analyzing the probability density function of said characteristic quantity of said signal generates an innovation at the input of the AGC which weights with a high weighting the negative remainders of a subtraction of the samples for which said characteristic quantity is high and with a low weighting the positive remainders of said subtraction.

It also proposes a method of using said device.

The invention also offers the advantage that the gain on the AGC servocontrol loop delay provides an additional time band for the correlation and therefore globally improves the effectiveness of the processing.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

In the description and the figures, the symbols, acronyms, formulae and abbreviations have the meaning as indicated in the table below.

| Symbol | Meaning |
| --- | --- |
| λ | Carrier wavelength |
| Alpha$_i$ | AGC adjustment parameters |
| Blanking | Suppression of the useful signal in the presence of interference |
| AGC | Automatic gain control |
| ADC | Analog-Digital Converter |
| CM | Core Module |
| DME | Distance Measuring Equipment |
| e | Received signal |
| EUROCAE | European Organization for Civil Aviation Equipment |
| f(a) | Optimum non-linear function of the gaussian noise |
| FDAF | Frequency Domain Adaptive Filtering |
| FIR | Finite Impulse Response filter |
| FPGA | Field-Programmable Gate Array |
| G | Receiver gain |
| GLONASS | Global Orbiting Navigation Satellite System |
| GNSS | Global Navigation Satellite System |

-continued

| Symbol | Meaning |
| --- | --- |
| GPS | Global Positioning System |
| JTIDS | Joint Tactical Information Distribution System |
| LSB | Least Significant Bit |
| LO | Local Oscillator |
| OSW$_i$ | Outputs of the high part of the CM |
| P(a) | Gaussian form noise |
| P$_{consi}$ | Set point power |
| P$_e$ | Input signal power |
| P$_s$ | Output signal power |
| TACAN | Tactical Air Navigation |
| UWB | Ultra-Wide Band |
| VGA | Voltage Gain Amplifier |

The GNSS systems currently use the frequency bands that are very close to the frequencies allocated to the DME radionavigation beacons. The GPS and future GPS frequencies are in bands: E6 (1260-1300 MHz), L2 (1216-1240 MHz) and L5/E5a (1164-1188 MHz). The Galileo frequencies are: E6, E5a and E5b (1188-1215 MHz). The DME frequencies are 1025-1150 MHz for an onboard interrogator and the ground beacons transmit in the 962-1213 MHz band (therefore in the GALILEO E5a and E5b and GPS L5 bands). The total band is subdivided into 126 channels and transmission and reception of a beacon are offset by 63 MHz. The channels are therefore 1 MHz apart. Pairs of pulses, each with a spectral width of 300 kHz, are transmitted by the onboard interrogator. The ground beacons respond to them with a fixed delay of 50 microseconds and the receiver of the onboard interrogator then searches for the pairs of pulses in response that have the correct spacing between them. The power of the signal transmitted by the ground beacons is of the order of 15 kW.

Figure 1:
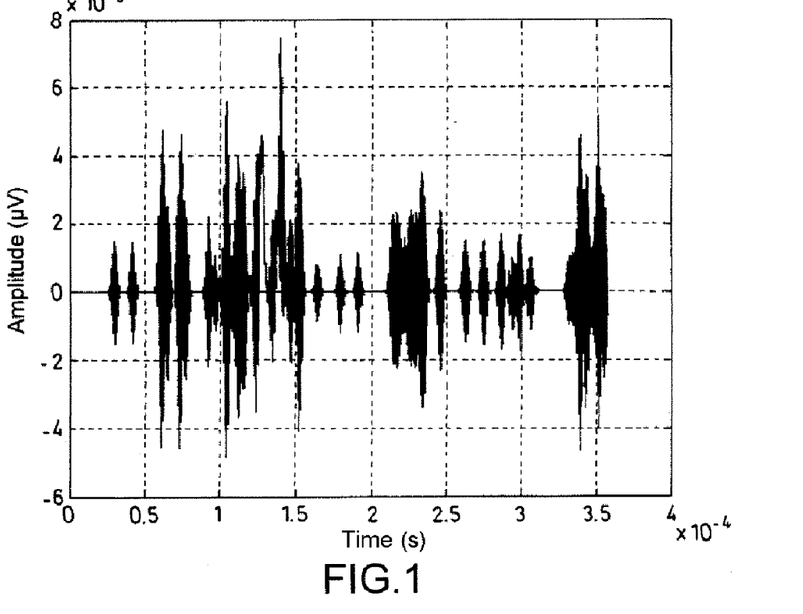
FIG. 1 represents the amplitude as a function of time of the pulsed interferences transmitted by a DME beacon.

These operating characteristics, diagrammatically represented amplitude/time-wise in FIG. 1, explain the highly disturbing nature of the DME system for satellite navigation, and all the more so as the occupancy rate of the interferences can reach 100% in the very dense beacon environments such as Northern Europe at high altitude.

Figure 2:
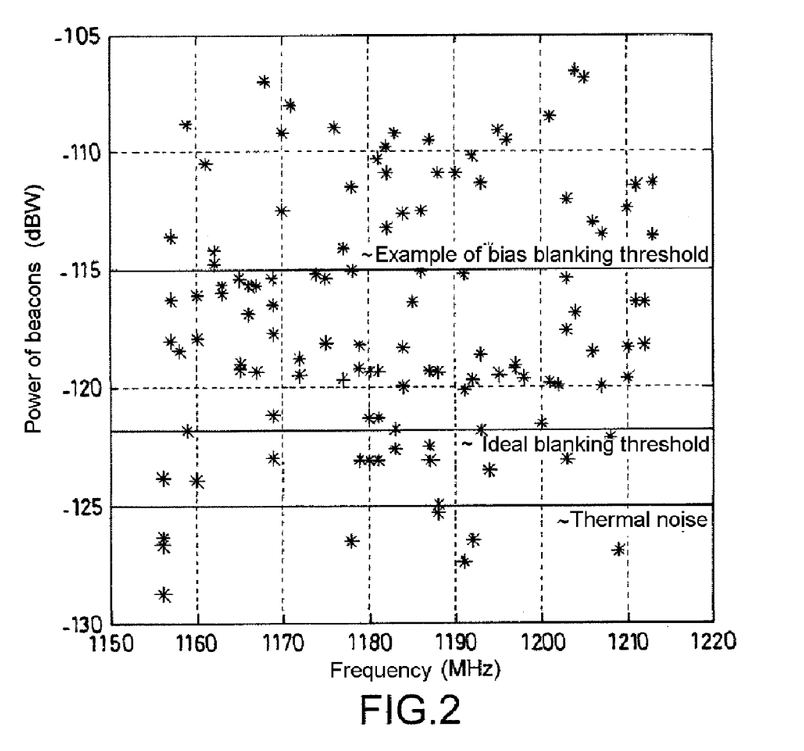
FIG. 2 represents the histogram as a function of frequency of the powers of the transmitters of pulsed interference received by an aircraft at the most scrambled point of the European air space.

FIG. 2 shows the number and the power of the DME beacons in the allocated frequency bands which are very close to L5/E5a at the maximum density point in the Northern European air space called "hotspot". The airplane gain is, by way of illustration, set at −10 dBi in this figure. The figure also shows: an example of thermal noise level (#−125dBW), the blanking threshold resulting from biased estimation of the thermal noise (#−115 dBW) and the optimum blanking threshold (#−122 dBW). The difference of 7 dBW is very significant in relation to the performance levels required of the receivers.

Now, a GNSS signal is below the thermal noise. A minimum signal-to-noise ratio is essential for the signal processing, based mainly on correlations, possibly assisted, of the received elements and their local replicas to be able to be effective. In particular, if the ADC is saturated by the interferences, the useful signal at the level of the correlators will be extremely degraded. This inability to reach the useful signal is clearly illustrated in FIG. 3 which shows the power curves at the filtering output with and without DME interferences. The time horizon is approximately 2 μs. Similar situations can occur in the presence of radars or ultra-wide band (UWB) pulsed devices.

Currently, the GNSS receivers use pre-correlation processing operations to process the pulsed interferences, for example the "blanking" method or the "FDAF" method.

Blanking is a simple method consisting in cutting off the signal during the interference. The method cannot operate when the interferences are too dense because the useful signal is then completely lost. The FDAF method constitutes an improvement of this method. It consists in subdividing the reception band into subbands and applying the blanking method to each subband.

However, these methods, while they make it possible to detect pulsed interferences and eliminate them, presuppose that the power of the thermal noise is accurately known. For example, if a pulse has an amplitude greater than that of the noise, then it can be said with a low false alarm probability that a pulse is present and it can be eliminated. This amounts to demanding an "ideal" AGC. In certain cases, it is possible to make a mistake concerning the knowledge of the noise power, without this compromising the effectiveness of the overall or band-oriented blanking. Such is the case for scenarios where the pulsed interferences are very powerful and therefore easy to detect: the time-oriented methods work well because the pulses are detected and not taken into account in the estimation of the thermal noise. Such is also the case in scenarios where the pulsed interferences are few and of low power: the estimation of the noise level is slightly biased but this does not hamper the operation of the receiver, even though the latter is a little degraded.

On the other hand, for scenarios where the pulsed interferences are many and of low power (difficult to detect), the estimation of the number of bits on which the noise is encoded is strongly biased. The time-oriented methods are no longer effective (probability of non-detection very greatly increased). The pulsed interferences are detected in relation to the estimation of the thermal noise. Since the estimation of the thermal noise is higher than the thermal noise itself when low-power pulses occur and are not detected, the blanking threshold is therefore higher than it should be as illustrated in FIG. 2. Therefore, pulsed interferences are included in the AGC calculation. The AGC reacts by lowering the gain of the VGA. Therefore, even more pulsed interferences are involved in the estimation of the thermal noise and so on. This continues to diverge until the receiver accepts the majority of the pulsed interferences and no longer encodes the useful signal.

Various methods make it possible to provide an unbiased noise reference to determine the blanking threshold. Some are presented in detail in the present description. They do, however, normally present the drawback of introducing a loop delay which will slow down the adjustment of the device to variations of the interference parameters.

To solve this problem that is unresolved in the prior art, the idea of the invention is to perform an inversion of the amplitude or of the power of the received signal to clip the pulses. If the pulsed interferences are not saturated by the ADC, the samples are recovered by the amplitude or power inversion. For example, if the thermal noise has been encoded on 4 bits and the ADC can linearly encode 8 bits, the samples on the 4 most significant bits are returned to the 4 least significant bits. The phase of the samples is retained but the signal-to-noise ratio is degraded. This amounts to a "digital AGC" which reacts very rapidly in the presence of pulses without the "analog AGC" reacting. This solution also makes it possible to save in correlation on the response time of the analog AGC in the presence of continuous interference.

The amplitude or power inversion consists in multiplying the input signal by the inverse of the filtered amplitude or power estimation. In the case where the inversion relates to the power of the signal, the power of the output signal is equal to the inverse of the power of the input signal, to within a constant. The gain of the receiver is given relative to a set point power by the formula:

$$G = P_{consi}/P_e$$

In the case where the inversion relates to the amplitude of the signal, the power of the output signal is equal to the inverse of the square of the power of the input signal, to within a constant. The gain of the receiver is given relative to a set point power by the formula:

$$G = (P_{consi}/P_e)^2$$

The power inversion is theoretically optimum. On the other hand, the amplitude inversion is less sensitive to production imperfections. The power inversion cannot, however, completely replace the blanking: when the ADC is saturated by the pulsed interferences, blanking is necessary in order to limit the spurious frequencies which, otherwise, would come into the correlation. For this reason, and to have a reference to set $P_{consi}$, it is necessary to have an unbiased noise reference.

Figure 4:
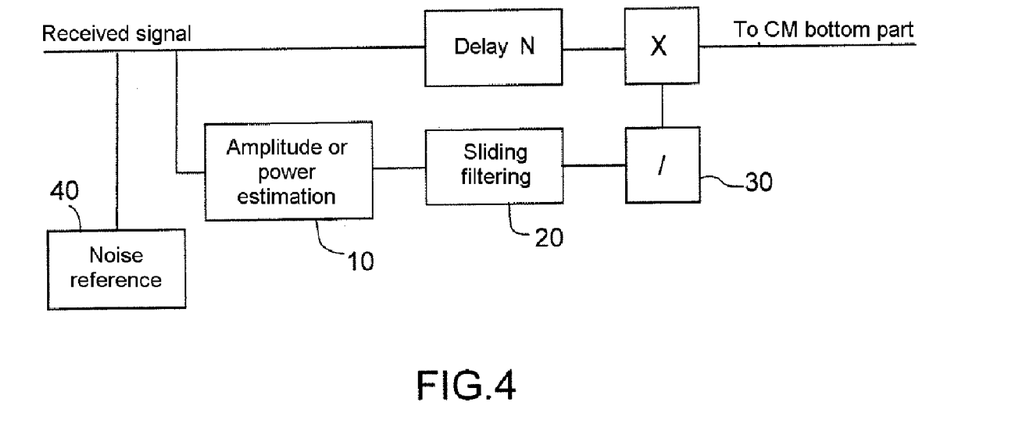
FIG. 4 represents a general block diagram of the implementation of the amplitude or power inversion.

There are several possible ways of implementing the capture of the unbiased noise reference. The common elements specific to the invention of the general embodiment architecture are described in FIG. 4. The device advantageously works in the baseband. This makes it possible to reduce the dynamic range before switching to interference frequency. The various functions represented in the figure are advantageously implemented in one and the same FPGA circuit in which the noise recovery functions can also be implemented. The first operator 10 is a conventional amplitude estimation function of type $I^2+Q^2$ (alternatively Root ($I^2+Q^2$) or |I|+|Q|). The second function 20 handles the filtering of the estimation to obtain the mean amplitude probability density. This filtering is performed over a suitable time horizon, for example 2.2 µs in E5b, which represents a 128-point sample. The estimation is advantageously made on a standard deviation representing 10% of the mean. Assuming interferences of variable dynamic range, it is possible to use a Kalman filter, if necessary adapted to a square pulse of minimum detectable amplitude. An amplitude or power inversion operator 30 is then applied to the outputs of the filter, the operator being activated when the ADC is not saturated, the saturation threshold depending on the thermal noise estimation.

A first embodiment consists in estimating the absolute thermal noise, giving an absolute blanking threshold and ensuring that the thermal noise does not change during the tests. In order to estimate the absolute thermal noise, the estimation of the gain of the HF subsystem is performed by laboratory calibration and the estimation of the noise figure by measuring the noise of the subsystem with the antenna disconnected. This combination of two point measurements provides an exact knowledge of the noise in the HF subsystem at a given moment and makes it possible to perform the blanking as a function of this noise estimation. Charts are needed from which to derive the thermal noise estimation bias variations according to temperature, pressure, dynamic range and aging. This solution can be praticable for stable environments but is less well-suited to receivers subject to major dynamic ranges.

Figure 3:
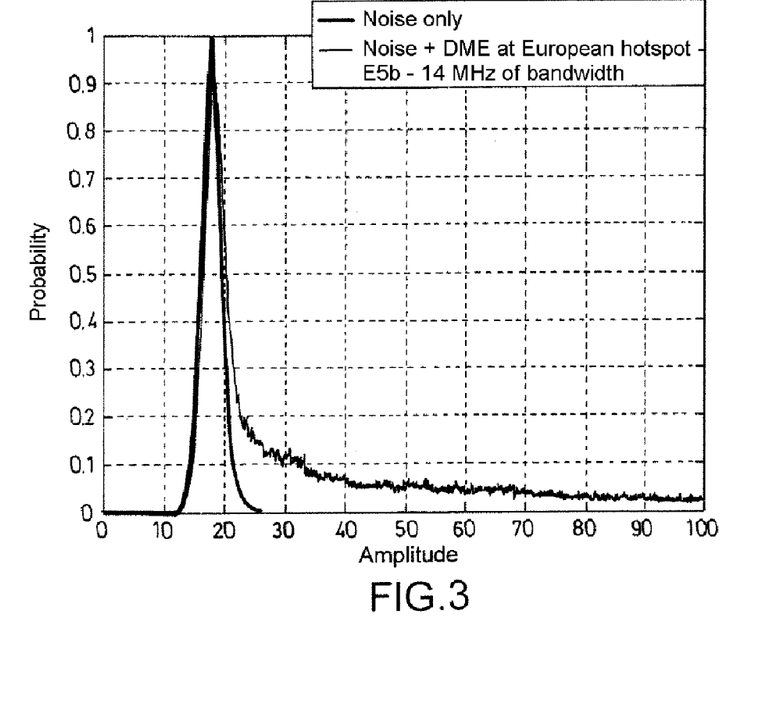
FIG. 3 represents, in a receiver of the prior art, the histogram of the filtered power as a function of the amplitude of the signal with and without interfering pulsed signal in the E5b band of the Galileo signal.

A second embodiment consists in using an unbiased estimation of the thermal noise by injection of an innovation calculated to optimize the gain of the receiver. The innovation is calculated on the basis of the analysis of the signal power or amplitude probability density function. This function is analyzed in its part where there are few high amplitude or power samples and which is affected little by the interferences as shown by FIG. 3.

Figure 5:
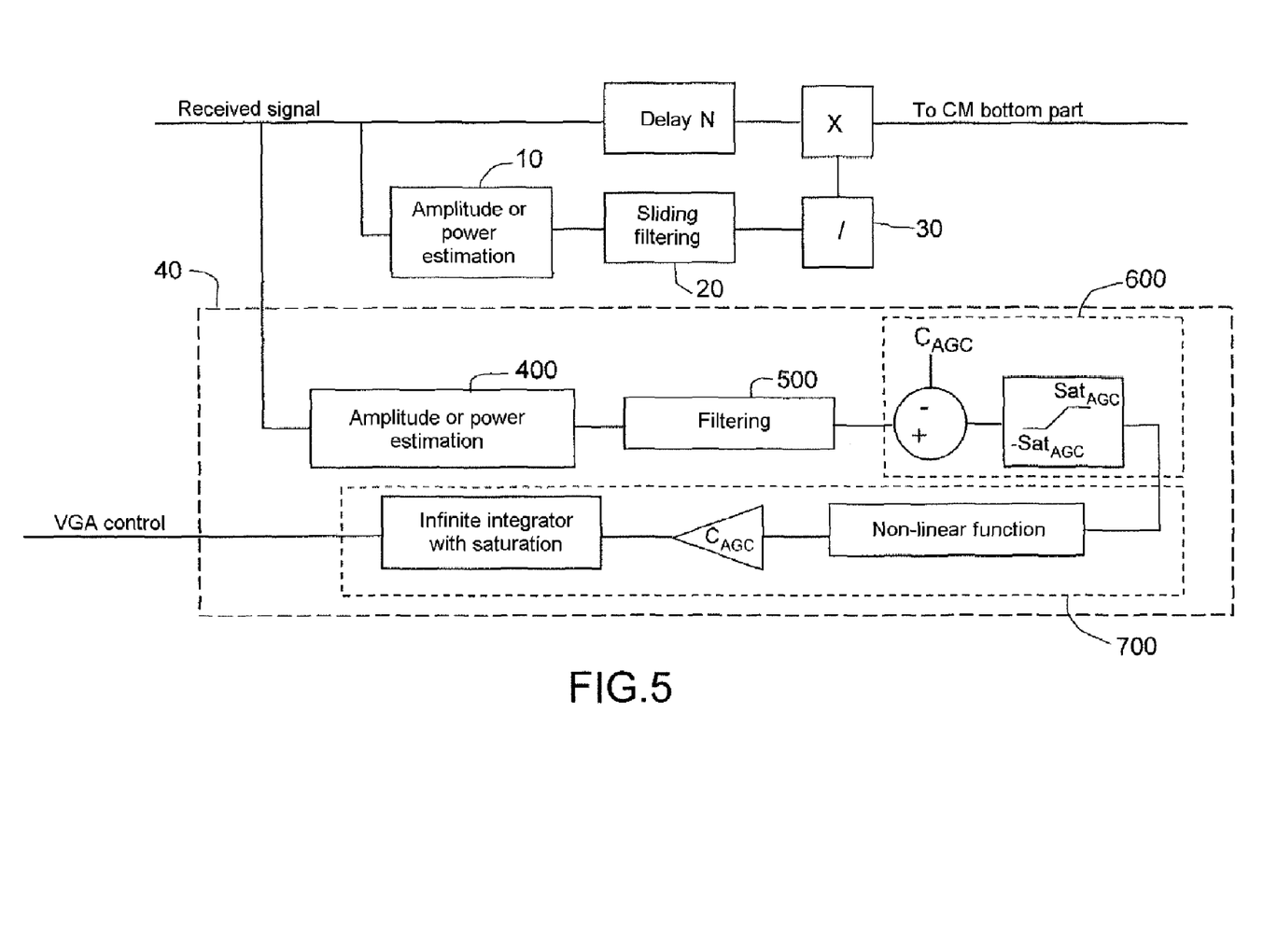
FIG. 5 represents a block diagram of the implementation of the amplitude or power inversion with automatic gain control in synchronous closed loop mode.

This injection can be performed synchronously. The module that is used is located in the bottom part (40) of FIG. 5. It can be located in the same FPGA as the basic device of the invention. It comprises a submodule 400 for estimating the amplitude or the power of the signal, a filtering submodule 500 which will have the same time constant as the filtering module described hereinabove. Conventionally, the device comprises an AGC submodule 60. At the input of this submodule 600, a control submodule 700, which comprises one or more non-linear functions which will generate an innovation from optimality parameters which depend on the usage context, is applied to the outputs of the filtering submodule. If the noise has a form P(a), the optimum non-linear function is given by the formula $$f(a)=(dP(a)/da)/P(a)$$

f(a) is a linear function when there are no pulses. In the presence of pulses, the linear function is retained in the left-hand part of the distribution which is, on the other hand, completely modified in its right-hand part. It is also possible to use a derivative of f(a).

The innovation is then introduced into the AGC. There are several possible variants for performing the observation and calculating the innovation.

A first variant consists in choosing a comparison point on the curve and servocontrolling the AGC by using a greater weighting of the samples of lower amplitude than the chosen point. A second variant consists in estimating the power curve filtered by adjustment to a theoretical curve that is parameterized over several points, for example three. A third variant consists in determining a histogram of said probability function and extracting therefrom the contribution of the noise alone then calculating the AGC control.

In the first two variants, efforts are made to servocontrol on the chosen comparison point or points by characterizing it or them by the ratio of the left-hand part and the right-hand part. One solution is to give greater weight to events of lower value than those exceeding the chosen point by an appropriate non-linear function, which makes it possible to considerably reduce the effect of the high values due to the pulses. It is possible in practice to arrive at this result by the use of one of the following functions or of another that would be comparable:

all-or-nothing non-linear function: if the event is less than the chosen point, then it is assigned a weighting k greater than 1; otherwise, it remains unchanged; this will lead to a balance such that the relative proportion is the value k, but the latter has been chosen to obtain the correct value of the mean in the presence of noise alone;
  dissymmetrical saturated function: operation is similar to the above but, in steady-state operation, allows for a linear operation in the vicinity of the chosen point allowing for a better AGC stability, which results in a good residual noise response time trade-off.

In the third variant, the principle is to determine the power of the noise by observation of the histogram (or the amplitude probability function) which can be performed by a number of methods:

breakdown of the histogram into the sum of laws of the khi2 (or approximated by a gaussian in the case with optional filtering) and determination of the most probable representative of the noise, for example the greatest among the small amplitudes (criterion optimized according to the a priori environment);
  breakdown of the histogram into the sum of a priori laws of the interferences and a law expected for the noise ($\chi^2$, gaussian), the mean of the noise law then being representative of the power of the noise alone;
  calculation of a likelihood function by correlation with the expected form in noise-only mode possibly weighted a priori.

The calculation of the histogram must be performed over a horizon that is sufficient to be representative.

The pitch of the histogram is chosen to be fine enough to discriminate the expected function (particularly its width equal to the standard deviation) from the other contributions that are generally closer to Dirac functions.

The filtering after comparison of the set point is not essential.

The component due to the noise is then determined and its mean can be compared with the set point value.

Only the first variant is described in detail in this patent application.

Hereinafter in the description, the chosen comparison point is the one that splits the samples into 10% lower amplitude probability and 90% higher probability. Another breakdown is possible and the control circuit can be adjusted to obtain a fine match with the particular interference profile. This breakdown is called "Alpha" in the digital examples described below.

It is also essential to choose other parameters "Alpha$_1$", "Alpha$_2$" and "Alpha$_3$" to provide a more or less optimum gain of the receiver which minimizes the bias affecting the blanking threshold.

"Alpha$_1$" is the probability of the AGC which is calculated as indicated hereinafter in the description. "Alpha$_2$" is the saturation weighting and "Alpha$_3$" is the blanking threshold setting parameter.

We want to establish the control of the AGC by observing the "Alpha" % of samples with the lowest amplitude.

We subtract a command containing (1−"Alpha") % of the samples to center the histogram with "Alpha" % of the samples below 0 and (1−"Alpha") % of the samples above 0. Then, we very strongly saturate the remainders. We weight the negative remainders with a weighting (1−"Alpha$_2$"), for example 0.9, and the positive remainders with a weighting "Alpha$_2$", in this case 0.1. The servocontrol of the AGC loop therefore has a balance point when this remainder is 0.

"Alpha$_2$" is linked to the filtering of the power before calculation of the AGC control and to the form of the noise gaussian. In our case, the filtering is performed over 128 samples (~2 μs) so the standard deviation of the thermal noise is reduced. When the setting is around a few percent, the gaussian changes strongly, therefore "Alpha$_2$" must be small.

This makes it possible to take account of the occurrences and not the amplitudes of the probability function for the major deviations and retains a small linear band making it possible to filter the residual noise of the power estimation.

The blanking threshold "Alpha$_3$" is set, for example in our applications, to a value between 0 and 16.

"Alpha 1" is calculated as follows:
I and Q are gaussian variables $$E[I]=E[Q]=0,\ E[I^2]=E[Q^2]=2^{2*(Nb\_out+Diff\_noise)}=\sigma^2$$

$I^2+Q^2$ have a mean of $2^{2*(Nb\_out+Diff\_noise)+1}$ and a standard deviation of $2^{2*(Nb\_out+Diff\_noise)+1}$ Because:

$$\mathrm{mean}(I^2+Q^2)=E[I^2+Q^2]=E[I^2]+E[Q^2]=2^*E[I^2]=$$
$$2^{2*(Nb\_out+Diff\_noise)+1}=2\sigma^2\,\mathrm{var}(I^2+Q^2)=E[(I^2+Q^2-2\sigma^2)^2]=$$
$$E[I^4]+E[Q^4]+4\sigma^4+2E[I^2Q^2]-4\sigma^2E[I^2]-4\sigma^2E[Q^2]=$$
$$3\sigma^4+3\sigma^4+4\sigma^4+2\sigma^4-4\sigma^4-4\sigma^4=4\sigma^4$$

because $E[x_1x_2x_3x_4]=E[x_1x_2]E[x_3x_4]+E[x_1x_3]E[x_2x_4]+E[x_1x_4]E[x_2x_3]$ $I^2+Q^2$ is averaged over 128 samples, the average is unchanged but the standard deviation becomes:

$$\frac{1}{\sqrt{128}} * 2^{2*(Nb\_out+Diff\_noise)+1}$$

Because:

$$\text{mean}\left(\sum_N (I^2+Q^2)\right) =$$

$$E\left[\sum_N (I^2+Q^2)\right] = \sum_N E[I^2+Q^2] = N2^{2*(Nb\_out+Diff\_noise)+1} =$$

$$2N\sigma^2 \text{var}\left(\sum_N (I^2+Q^2)\right) = E\left[\left(\sum_N (I^2+Q^2) - 2N\sigma^2\right)^2\right] =$$

$$E\left[\left(\sum_N ((I^2+Q^2) - 2\sigma^2)\right)^2\right] = \text{var}\left(\sum_N ((I^2+Q^2) - 2\sigma^2)\right) =$$

$$NE\left[\left(\sum_N ((I^2+Q^2) - 2\sigma^2)\right)^2\right] = 4N\sigma^4$$

The conventional tables associate with each random value its probability in the case of a standard gaussian and standard deviation 1. To obtain a probability of 10% for example, we take the opposite of the value at 90% (−1.29), we multiply it by the standard deviation and we add the off-centering of the gaussian. In this example, we therefore have $$-1.29 \frac{1}{\sqrt{128}} * 2^{2*(Nb\_out+Diff\_noise)+1} +$$

$$2^{2*(Nb\_out+Diff\_noise)+1}\left(1 - \frac{1.29}{\sqrt{128}}\right) 2^{2*(Nb\_out+Diff\_noise)+1} = 0.8860$$

The adjustment examples given in the table below are given purely by way of illustration:

| AGC adjustment: "alpha" | AGC probability "alpha 1" | Saturation "alpha 2" | Blanking threshold setting "alpha 3" | AGC type |
|---|---|---|---|---|
| 6% | 0.863 | 0.06 | 16 | |
| 10% | 0.886 | 0.1 | 8 | AGC chosen for the DME/TACAN scenario |
| 17% | 0.916 | 0.1 | 4 | |
| 25% | 0.9408 | 0.1 | 2 | AGC chosen when the pulse scenarios are not clear |
| 33% | 0.9346 | 0.1 | 1 | |
| 50% | 1 | 0.5 | 0 | Conventional AGC |

Figure 6:
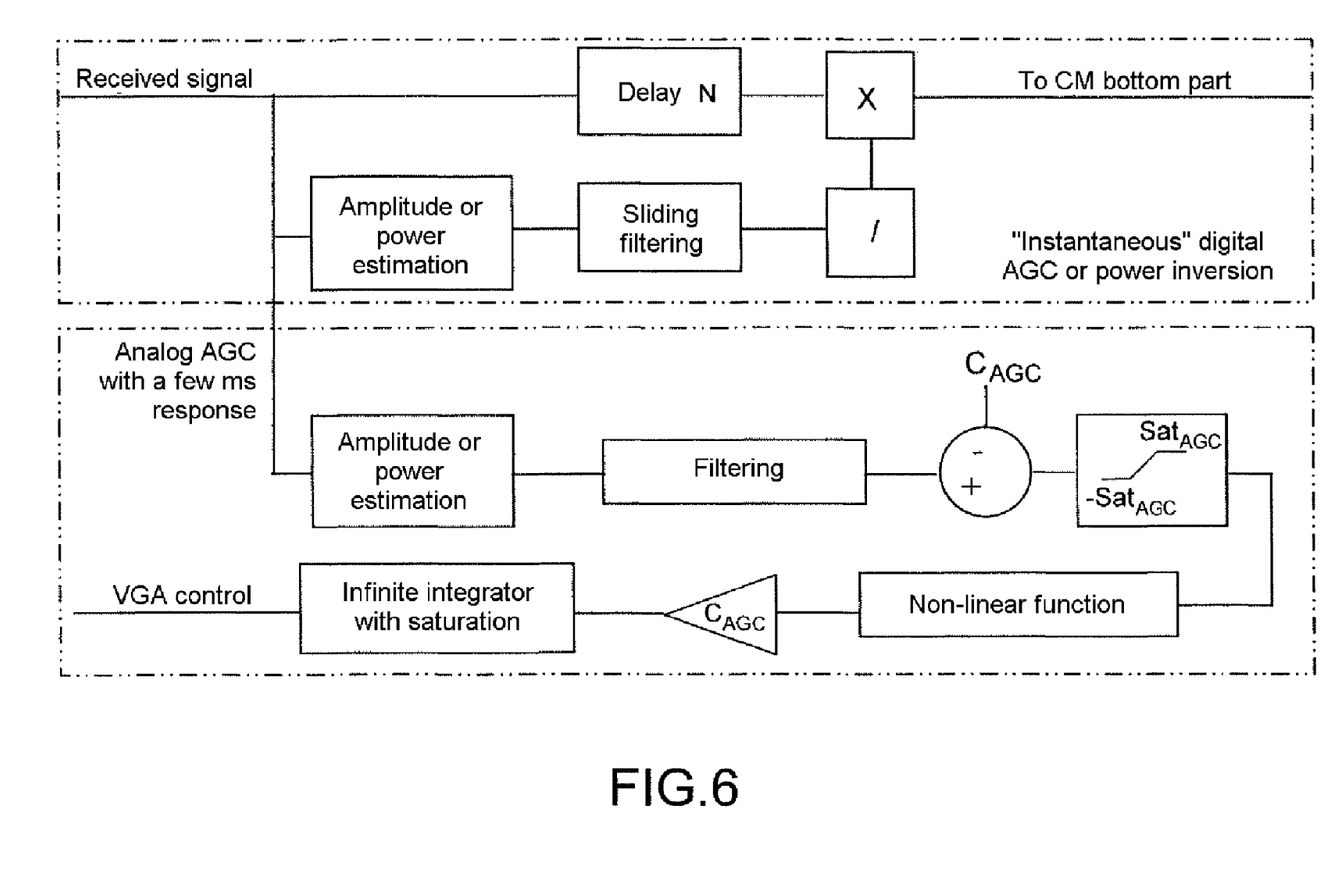
FIG. 6 represents a block diagram of the implementation of the amplitude or power inversion with an automatic gain control in asynchronous closed loop mode.

It is also possible to inject an estimation of the thermal noise over a response time greater than the filtering constant. It is possible, for example, to choose a cycle time of a few ms. This variant is illustrated in FIG. 6. The advantage of this option is that it allows a lower dynamic range for the operators.

Figure 7:
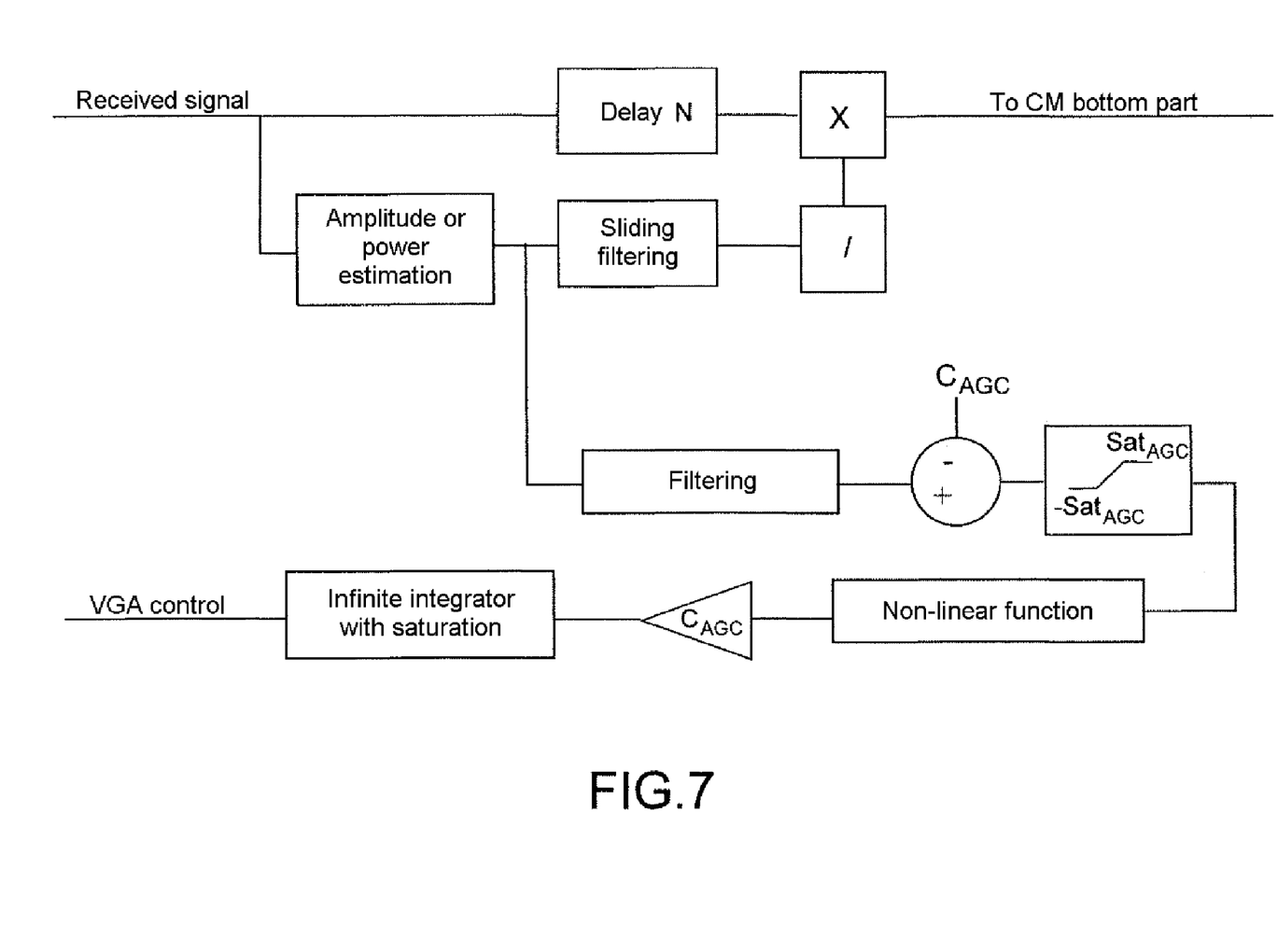
FIG. 7 represents a variant of FIG. 5 where the amplitude/power estimation is factorized between the inversion module and the AGC servocontrol module.
Figure 8:
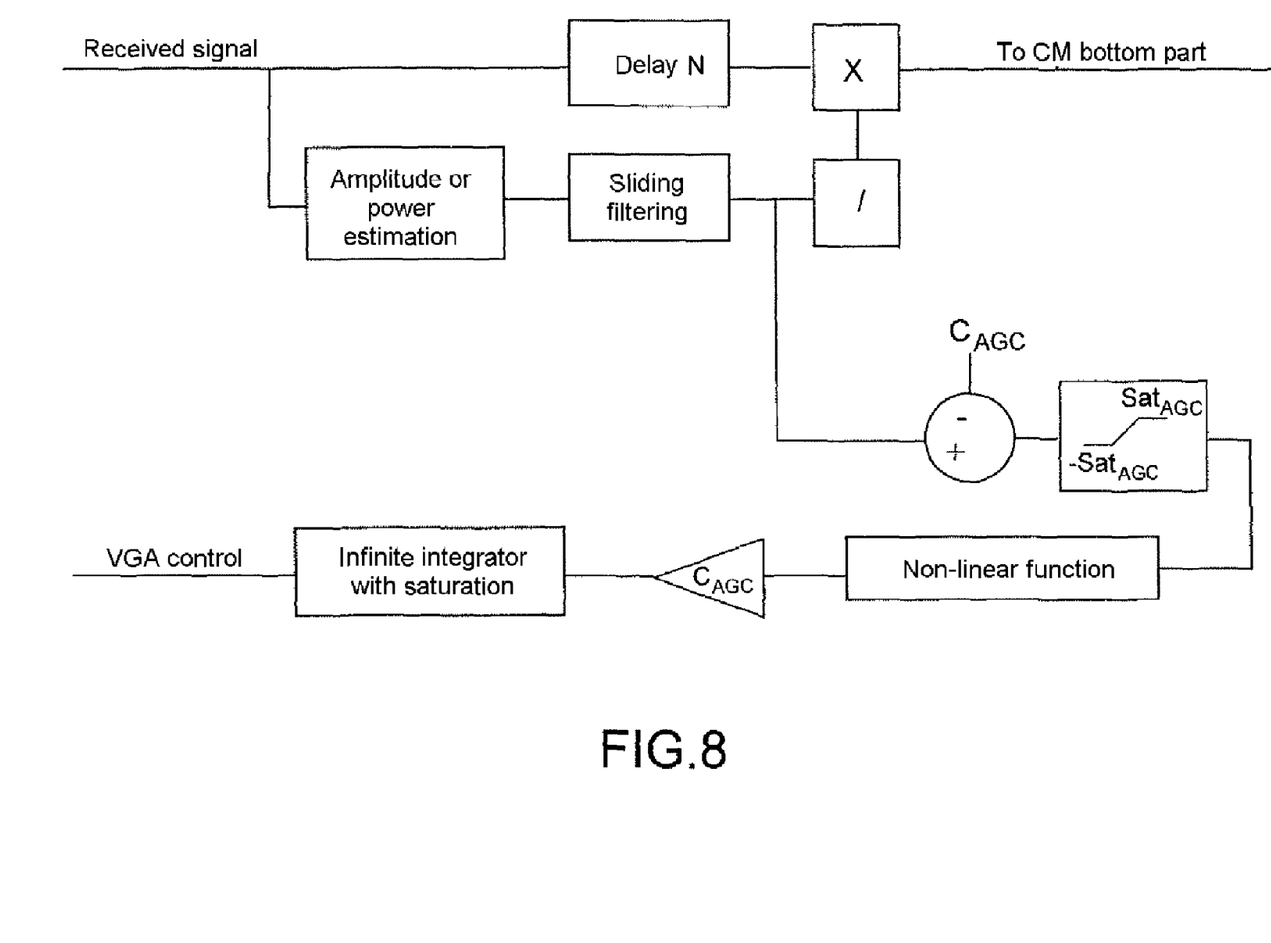
FIG. 8 represents a variant of FIG. 5 where the amplitude/power estimation and the filtering are factorized between the inversion module and the servocontrol module of the AGC.
Figure 9:
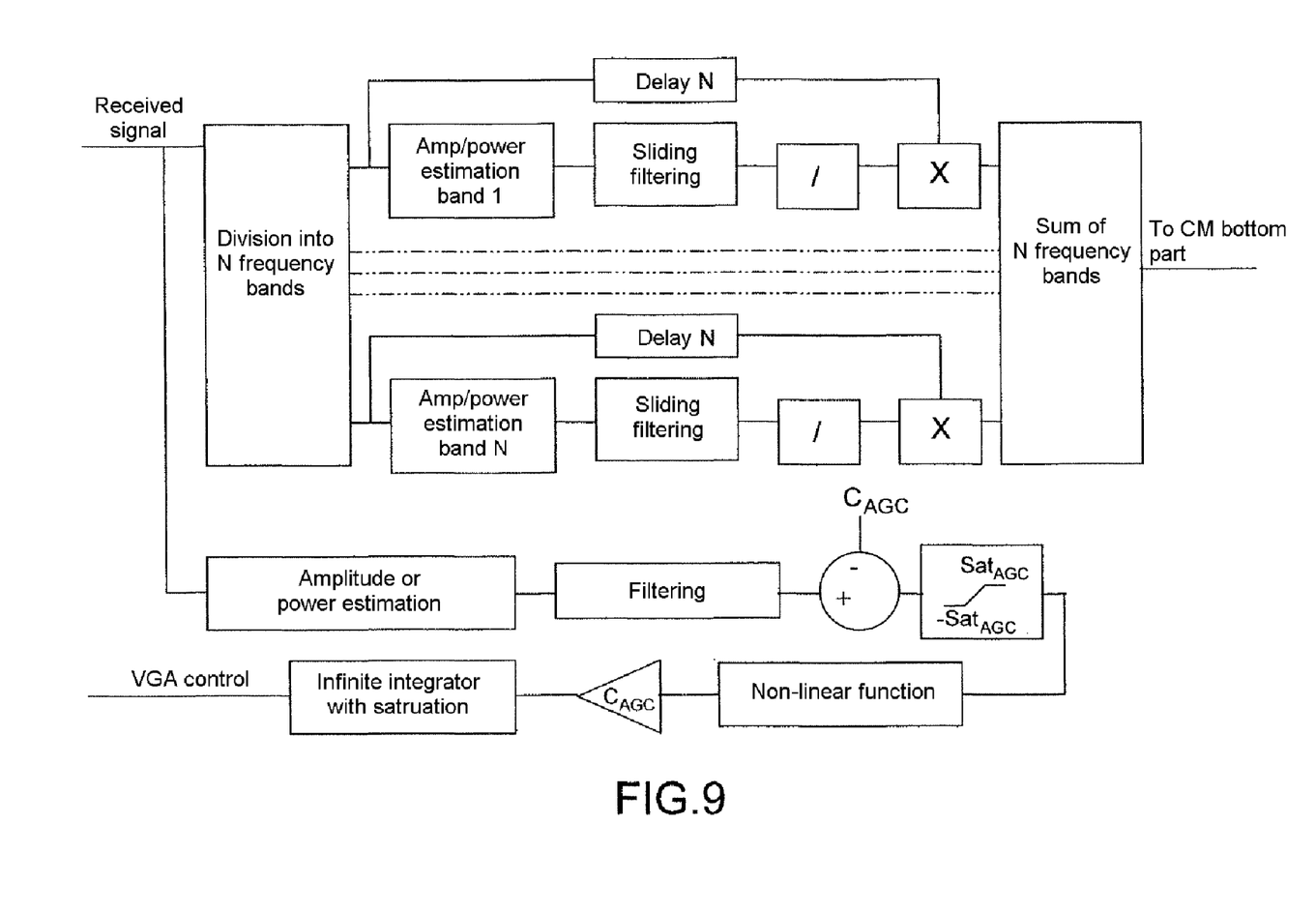
FIG. 9 represents an embodiment of the invention where the amplitude/power inversion is performed on several frequency subbands.

It is possible to factorize certain architecture elements of the two submodules, in particular the amplitude/power estimation function (FIG. 7) and the filtering function (FIG. 8). It is also possible to perform an inversion for each frequency band (FIG. 9). In this option, a blanking will also be performed in each band above the threshold. For example, for a BOC signal, the inversion and the blanking can be performed in the two wide bands and the two narrow bands. The advantage of performing inversion and blanking for each band is that it enhances the signal-to-noise ratio, the portion of the useful signal that is retained being greater.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A device for receiving a radiofrequency navigation signal comprising:
    a module for estimating a characteristic quantity of said radiofrequency navigation signal chosen from at least one of amplitude or power group; a module for filtering said characteristic quantity; and
    a module for inverting said characteristic quantity by multiplying said radiofrequency navigation signal by the inverse of the filtered estimated amplitude or power, wherein at least one of the estimating, filtering and inverting modules receives as an input an output of an estimating module of a thermal noise of said receiving device while correcting an estimation bias of said characteristic quantity to ensure an optimal or quasi optimal gain of said receiving device.

2. The receiving device of claim 1, further comprising an AGC module at an output of the estimating module of the thermal noise.

3. The receiving device of claim 1, only comprising a module for estimating the characteristic quantity of the signal chosen from the amplitude or the power group.

4. The receiving device of claim 1, only comprising a module for filtering the radiofrequency navigation signal.

5. The receiving device of claim 1, wherein the estimating module of the thermal noise comprises a control submodule, the control submodule comprising a sub-module for analyzing a probability density function of said characteristic quantity of said radiofrequency navigation signal.

6. The receiving device of claim 5, wherein the sub-module for analyzing the probability density function of said characteristic quantity of said radiofrequency navigation signal performs an estimation based on a chosen comparison point.

7. The receiving device of claim 6, wherein the sub-module for analyzing the probability density function of said characteristic quantity of said radiofrequency navigation signal works on a sampling of the radiofrequency navigation signal enriched with low power signals.

8. The receiving device of claim 7, wherein the sub-module for analyzing the probability density function of said characteristic quantity of said radiofrequency navigation signal generates an innovation at the input of a digital AGC module which weights with a high weighting negative remainders of a subtraction of samples for which said characteristic quantity is high and with a low weighting positive remainders of said subtraction.

9. A method of processing a radiofrequency navigation signal comprising:
    receiving the radiofrequency navigation signal;
    a step for estimating a characteristic quantity of said radiofrequency navigation signal chosen from at least one of amplitude or power group;

a step for filtering said characteristic quantity; and a step for inverting said characteristic quantity by multiplying said radiofrequency navigation signal by the inverse of the filtered estimated amplitude or power, wherein at least one of the steps for estimating, filtering and inverting receives as an input an output of an estimating module of a thermal noise of said method of processing while correcting an estimation bias of said characteristic quantity to ensure an optimal or quasi optimal gain of said method of processing.

10. The method of claim 9, wherein the estimating step of the thermal noise comprises a control sub-step, the control sub-step comprising a sub-step for analyzing a probability density function of said characteristic quantity of said radiofrequency navigation signal.

11. The method of claim 10, wherein the sub-step for analyzing the probability density function of said characteristic quantity of said radiofrequency navigation signal produces an estimation based on a chosen comparison point.

12. The method of claim 11, wherein the sub-step for analyzing the probability density function of said characteristic quantity of said radiofrequency navigation signal works on a sample of the radiofrequency navigation signal enriched with low power signals.

13. The method of claim 12, wherein the sub-step for analyzing the probability density function of said characteristic quantity of said radiofrequency navigation signal generates an innovation at the input of a digital AGC step which weights with a high weighting negative remainders of a subtraction of samples for which said characteristic quantity is high, and with a low weighting positive remainders of said subtraction.

14. The method of claim 9, further comprising an AGC step at an output of the estimating step of the thermal noise.

15. The method of claim 9, which comprises only a step for estimating the characteristic quantity of the signal chosen from the amplitude group or the power group.

16. The method of claim 9, which comprises only a step for filtering the radiofrequency navigation signal.

* * * * *